United States Patent [19]

Cormier et al.

[11] Patent Number: 5,324,416
[45] Date of Patent: Jun. 28, 1994

[54] INCREASING METAL-TOLERANCE OF FCC CATALYST BY SULFUR OXIDE REMOVAL

[75] Inventors: William E. Cormier, Ellicott City; Gerald M. Woltermann, Westminster; John S. Magee, Ellicott City, all of Md.; Fred J. Baars, Leiden, Netherlands; Lawrence L. Upson, Barrington, Ill.

[73] Assignee: W. R. Grace Co.-Conn., New York, N.Y.

[21] Appl. No.: 722,048

[22] Filed: Jun. 27, 1991

Related U.S. Application Data

[63] Continuation-in-part of Ser. No. 673,887, Mar. 22, 1991, Pat. No. 5,173,174.

[51] Int. Cl.$^5$ .................................................. C10G 11/02
[52] U.S. Cl. .................................... 208/113; 208/120
[58] Field of Search ................................ 208/113, 120

[56] References Cited

U.S. PATENT DOCUMENTS

| | | | |
|---|---|---|---|
| 4,341,661 | 7/1982 | Baron et al. | 252/455 Z |
| 4,451,355 | 5/1984 | Mitchell et al. | 208/113 |
| 4,495,304 | 1/1985 | Yoo et al. | 502/66 |
| 4,889,615 | 12/1989 | Chin et al. | 208/113 |
| 4,957,892 | 9/1990 | Yoo et al. | 502/63 |
| 4,971,935 | 11/1990 | Bartek et al. | 502/64 |
| 4,988,653 | 1/1991 | Herbst et al. | 502/67 |
| 5,007,999 | 4/1991 | Chin | 208/113 |
| 5,173,174 | 12/1992 | Upson et al. | 208/120 |

*Primary Examiner*—R. Bruce Breneman
*Assistant Examiner*—Walter D. Griffin
*Attorney, Agent, or Firm*—Arthur P. Savage

[57] ABSTRACT

An FCC catalyst system and a process using the catalyst system are disclosed. The catalyst system comprises a metal trap component, such as bastnaesite or barium titanate, and a sulfur oxide acceptor such as a magnesium spinel in addition to a zeolite. The metal trap and sulfur oxide components are preferably in separate particles. The catalyst formulation results in improved activity believed to result from the sulfur oxide acceptor protecting the metal trap component from the harmful effects of sulfur oxides such as the formation of stable metal oxides.

8 Claims, No Drawings

INCREASING METAL-TOLERANCE OF FCC CATALYST BY SULFUR OXIDE REMOVAL

CROSS REFERENCE TO RELATED APPLICATION

This application is a continuation-in-part of copending application Ser. No. 07/673,887 filed Mar. 22, 1991 now U.S. Pat. No. 5,173,174.

BACKGROUND OF THE INVENTION

1. Field of the Invention

The invention relates to fluidized catalytic cracking (FCC) processes and to the composition of the particles circulated in these processes. The invention specifically relates to the use of "metal traps" in FCC catalysts and to the use of sulfur adsorbing or transferring particles to reduce the release of sulfur oxides from FCC units. More specifically the invention relates to the simultaneous use of catalyst components designed to reduce the deleterious effects of vanadium and nickel on FCC catalyst together with spinel-containing sulfur oxide transfer particles.

2. Prior Art

The use of additives to counter the effects of metals such as vanadium and nickel on FCC catalysts and the use of additives to reduce the discharge of sulfur oxides with FCC flue gases are both described in the prior art.

The catalyst deactivating effects of vanadium can be diminished by incorporating a vanadium trapping agent into the catalyst. Alumina and rare earth oxides have been described as such a trapping agent in U.S. Pat. No. 4,988,653 issued to J. A. Herbst et al.

U.S. Pat. No. 4,971,935 issued to R. Bartek et al. is believed relevant for its teaching as to the use of a catalyst component comprising calcium and tin, such as calcium stannate, to reduce the deleterious effects of metals in the feed stream charged to an FCC process.

U.S. Pat. No. 4,451,355 to B. Mitchell et al. discloses various vanadium passivating additives consisting of multimetallic calcium-titanium and calcium-zirconium oxides and various other calcium-containing oxides.

The use of spinel-containing discrete entities circulated with the FCC catalyst to retain sulfur oxides formed in the regeneration zone and to release hydrogen sulfide in the FCC reaction zone is described in U.S. Pat. No. 4,957,892 issued to J. S. Yoo et al.

U.S. Pat. No. 4,341,661 issued to K. Baron et al. is believed relevant for its teaching that a bastnaesite component is effective in reducing the sulfur oxide and carbon monoxide emissions from an FCC regeneration zone. The bastnaesite may be employed in the form of separate particles which circulate through the FCC unit with the catalyst or the bastnaesite may be physically incorporated into the catalyst.

European patent application No. 89306806.4 (EP-A-350280) by L. Upson et al is addressed to the use of an FCC catalyst composition comprising bastnaesite, a zeolite and alumina. The bastnaesite is described as improving the metal tolerance of the catalyst and is not employed as a sulfur oxide transfer agent.

U.S. Pat. No. 5,007,999 issued to A. A. Chin is believed pertinent for its teaching of a process for reducing sulfur oxide emissions from an FCC unit while also addressing the problem of metal contamination of the catalyst. In this process the metals are passivated with a sulfur compound such as hydrogen sulfide or a thiol, with the sulfur reacting with the metal. The sulfur is released in the regeneration zone and converted into sulfur oxides which in turn are removed by contact with metal containing particles. This reference refers to several metal-containing screte entities used for this purpose including alumina, oxides of Group IIA metals such as magnesia and cerium oxides. The reference indicates the use of metal-containing spinels including those containing magnesium is preferred.

U.S. Pat. No. 4,889,615 issued to A. A. Chin et al. is believed to be pertinent for its teaching as to reducing sulfur oxides emissions from an FCC regeneration zone while simultaneously protecting the zeolitic component of the catalyst with a metal trap, with both functions being performed by a single additive comprising a dehydrated magnesium-aluminum hydrotalcite. The reference describes the use of magnesium-aluminate spinels to control sulfur oxide emissions.

SUMMARY OF THE INVENTION

We have found that sulfur oxide transfer agents can increase the activity of an FCC catalyst which contains a "metal trap" designed to reduce the effects of metal on the catalyst. It is theorized that a properly chosen sulfur oxide transfer agent protects a metal-containing nickel and/or vanadium trap catalyst component which would otherwise be deactivated by the formation of highly stable metal sulfate compounds. A specific discovery is that the activity of a bastnaesite-containing FCC catalyst is improved by the presence of spinel-containing sulfur transfer particles. The beneficial and synergistic effects of this combination have not been recognized in the prior art. The sulfur oxide transfer agent may be formulated into the catalyst particle but is preferably utilized as a separate particle circulated in admixture with the catalyst.

One embodiment of the invention may be characterized as a fluidized catalytic cracking process which comprises simultaneously contacting a metal-containing chargestock with (i) a catalyst comprising about 10 to 40 wt. % zeolite and about 3 to 15 weight percent of a nonexchangeable rare earth component comprising a rare earth carbonate, oxy fluoride or phosphate; and (ii) a second discrete particle comprising a sulfur oxide trapping component in an FCC reaction zone maintained at reaction conditions and recovering product hydrocarbons.

DETAILED DESCRIPTION OF THE INVENTION

In an FCC process the feed stream, such as a gas oil or a HVGO (heavy vacuum gas oil), is contacted with a fluidized or ebulated bed of catalyst. Such a feed typically has an initial boiling point of about 500°–650° F. (260°–343° C.) and an end boiling point of about 900°–1000° F. (482°–538° C.). This contacting is commonly performed in a riser-type reactor with the feed and catalyst traveling upward through a vertical reactor and being separated at the outlet of this reactor. Contacting may also occur in a "bubbling" bed of the catalyst retained within a lower portion of a vessel. FCC operating procedures and conditions are well known. Average contact times are in the range of about 1.5 to about 5 seconds. FCC reaction conditions also include a temperature of about 900°–1050° F. (482°–566° C.) and an absolute pressure of from atmospheric to about 4 bars. The reaction is normally performed in the absence of added hydrogen. A limited amount of steam may be charged to the reaction zone.

The vaporous portion of the effluent of the reaction zone is quickly separated from the catalyst and fed to a fractional distillation zone. The reaction zone effluent is therein separated into a stream of light gases such as ethane, propane, propylene, butane and butylene and one or more product streams—typically naphtha, kerosene, diesel fuel and heavy distillate which are withdrawn from the process as separate product streams. The used or spent catalyst is passed into a regeneration zone in which the carbonaceous deposits referred to as coke are removed by combustion. FCC processes have been widely used commercially for over forty years and are described in U.S. Pat. Nos. 4,551,229; 4,504,380; 4,384,948; 4,340,566 and 4,211,636 which are incorporated herein by reference.

FCC feed stocks can contain substantial quantities of metal-containing compounds. Accumulation of these metals can damage the FCC catalyst and adversely effect the product yield of the process. Of the metals found in FCC feed stocks vanadium and nickel are the most deleterious. A current hypothesis is that vanadic acid is formed by hydrolysis of vanadium pentoxide formed in the regenerator and causes irreversible destruction of the zeolite crystalline structure resulting in a loss of surface area and catalytic activity. It has been postulated that the zeolite is destroyed in much the same way as with other acids, i.e., catastrophic dealumination. The zeolite component of the catalyst causes a large portion of the selective catalytic cracking. Product selectivity will therefore be altered significantly by the presence of vanadium including the production of more undesired hydrogen and coke. Nickel which accumulates on the catalyst does not cause the destruction of crystalline zeolite material but does produce large quantities of hydrogen and coke.

The detrimental effects caused by the accumulation of vanadium and nickel on an FCC catalyst are a major factor in determining the rate at which used catalyst must be withdrawn from an FCC process and replaced with new catalyst. The withdrawn catalyst is typically disposed of as by landfilling, but the metals content of the catalyst can make this unacceptable. New technology is being developed for removing metals from used catalyst, but employing this technology costs money for equipment, labor and supplies.

It has therefore been deemed highly desirable to find a catalyst or process which reduces these negative effects of vanadium and nickel. It is an objective of the subject invention to reduce the negative effects of feed stock vanadium and nickel on the performance of FCC catalyst. It is another objective of the invention to provide an improved FCC process and an improved FCC catalyst admixture for use with metal containing feed stocks.

As used herein the term "accumulated metal" is intended to refer to metal originally present in an FCC feedstream and subsequently deposited on a catalyst during usage in an FCC process. The accumulated metals will normally be nickel and vanadium but other metals can be present. The invention finds utility at accumulated metal levels above about 1000 wt. ppm. The advantages of the invention become more pronounced at higher levels such as 2000 wt. ppm or 5000 wt. ppm accumulated metals. Specific embodiments of the invention therefore are utilized with an equilibrium catalyst having these higher metal contents.

It was recently found that the use of bastnaesite in an FCC catalyst matrix significantly improves coke and light gas selectivity and catalyst stability in the presence of high levels of vanadium. This is described in previously cited EP-A-350280. As indicated in the previously cited U.S. Pat. No. 4,341,661 to K. Baron et al. it is known that bastnaesite can also be employed as a sulfur oxide transfer agent in an FCC process. However, in the subject process bastnaesite is used solely as a metal trapping component of the catalyst.

In this invention, we have found that even greater benefits can be achieved when a more active sulfur oxide transfer agent, such as a spinel, is used with a bastnaesite containing FCC catalyst. It is theorized that the sulfur oxide transfer agent protects the metal trap function of the bastnaesite by preventing or lessening the formation of relatively stable metal sulfates on the bastnaesite used in catalyst. This can also be viewed as allowing the metal trap function of the catalyst to work to its full potential. While the exact mechanism responsible has not been determined the example below indicates that the unique combination of the subject invention provides a synergistic effect on the performance of the FCC process. The activity of the catalyst is increased and the amount of sulfur oxides emitted from the regeneration zone is reduced.

The sulfur oxide transfer agents employed in the subject invention function by picking up sulfur oxides, e.g. sulfur trioxide, in the oxidative conditions of the FCC regeneration zone and then releasing hydrogen sulfide in the reducing atmosphere of the FCC reaction zone. The sulfur oxides are formed during the combustion of the coke deposits which occurs in the regeneration zone. These coke deposits, which are formed in the reaction zone, will contain sulfur when sulfur is present in the FCC charge stock.

The typical mechanism for the removal of sulfur oxides from the regeneration zone using sulfur oxide transfer agents requires the presence of available oxygen. The FCC regeneration zone is therefore operated with at least 1 mole percent available oxygen. Other regeneration conditions include a temperature of from about 538 to about 788 degrees C. and a pressure similar to that employed in the reaction zone.

The metal trap component of the subject invention may have sulfur oxide transfer capabilities. For instance bastnaesite has been employed to transfer sulfur oxides to the reaction zone. In the subject invention the sulfur oxide transfer component must be sufficiently active and present in a sufficient quantity to have a greater activity for removing the sulfur oxides from the regeneration zone than any material present as a metal trap.

The subject invention can be employed when it is not desired or necessary to reduce the sulfur oxide content of the regenerator flue gas stream. That is, the subject invention finds utility due to its beneficial action on the catalyst even in instances when the regenerator flue gas is being treated downstream of-the regeneration zone for the removal of sulfur oxides.

The spinel-containing sulfur oxide transfer agents have been found to be adversely affected by silica. It is therefore preferred to minimize the contact between the spinel and any silica, As one of the preferred binders for the catalyst particles is a silica sol, the incorporation of a spinel into the catalyst particle is expected to lead to spinel deactivation by silicon. For this reason it is preferred that a spinel-containing sulfur oxide transfer agent is not incorporated into the catalyst but is instead utilized as part of a separate particle circulated through the FCC process in admixture with the catalyst as part of an overall catalyst system.

The use of silica containing molecular sieves, silica-alumina or silica binders in the FCC catalyst is believed to result in some silica vapor pressure in high temperature portions of the FCC process. Silica can therefore migrate to the spinel even if employed in separate particles or an aluminasbinder is used, but the use of a two or three particle system will mitigate the effect.

The amount of sulfur oxide transfer agent and the amount of metal trap which are optimum for any specific process application will ultimately depend on such process related factors as the amount of sulfur and metals present in the chargestock. The optimum concentration of these materials will therefore vary between applications. The relative amount of sulfur oxide transfer agent should be sufficient to produce the desired reduction in the sulfur oxide content of the FCC regenerator flue gas stream and to provide the necessary protection of the metal trap component of the catalyst. When both the metal trap and sulfur oxide transfer components are present in the same particle, it is preferred that each particle contain at least 1 and preferably at least 2 wt. percent of each component. When a dual particle catalyst system is employed the amount of sulfur oxide transfer agent in the catalyst system should be equal to from about 0.5 to about 20, preferably 0.5 to 5.0, wt. percent of the catalyst particles in the circulating catalyst system. Magnesium-aluminum spinels are typically used at a concentration of 2–3 wt. % with an upper limit of 5 wt. % of the equilibrium catalyst. The weight ratio of sulfur oxide transfer agent to metal trap component is preferably from about 1.0:4.0 to about 1.0:0.5, with this ratio not counting alumina present in the catalyst system as either a sulfur oxide transfer agent or metal trap.

The subject invention is believed applicable to a wide variety of sulfur oxide transfer agents. Some of these agents may not be adversely effected by contact with silicon. In this instance it may be preferred to incorporate the sulfur oxide transfer agent into the catalyst particle to ensure a closer placement to the metal trap to be protected.

The subject invention is also believed to be applicable to a variety of materials capable of functioning as metal traps. It is therefore not intended to limit the interpretation of the invention and the scope of the appended claims to the use of a bastnaesite containing metal trap. For instance, it is believed that other metal trap materials referred to herein such as titanates would also function in and benefit from the subject invention.

Among the materials which may be employed as the metal trap component are calcium titanate or calcium zirconate perovskite as described in previously cited U.S. Pat. No. 4,451,355. It is indicated that these additives should be present in the catalyst at a concentration of from about 5 to about 40 wt. percent. Several different calcium titanates and calcium zirconates are referred to in this reference. European patent application No. 0 194 536 discloses the use of barium titanium oxides, barium titanates, as metal trap components in FCC catalysts. U.S. Pat. No. 4,473,463 discloses the use of various barium compounds as catalyst treating agents or catalyst components, and U.S. Pat. No. 4,432,890 describes the use of a wide variety of metal additives for use in protecting the zeolitic portion of an FCC catalyst from metal attack. This reference refers to titania and zirconia as having beneficial effect in tying up vanadium and reducing catalyst deactivation.

The preferred metal trap components are barium titanate, calcium titanate and bastnaesite, with bastnaesite being especially preferred. Bastnaesite is a mixed rare earth fluorocarbonate mineral or ore usually found deposited with zinc. As a raw ore it normally contains about 65 to 80 weight percent rare earth elements (calculated as the oxides). It is a primary industrial source of rare earths. Bastnaesite contains a mixture of rare earths including praseodymium, neodymium, samarium, europium and gadolinium. Bastnaesite usually contains over 80 wt. percent lanthanum and cerium. It has been reported that the composition of bastnaesite reported as rare earth oxides will normally fall within the following ranges: 45 to 55 wt. % $CeO_2$, 29 to 35 wt. % $La_2O_3$, 11 to 15 wt. % $Nd_2O_3$, 2.5 to 5.5 wt. % $Pd_2O_3$, 0.3 to 0.7 wt. % $Sm_2O_3$, and lesser amounts of the other rare earths.

Bastnaesite may be used in either a calcined or uncalcined state, which remains stable and does not dissolve during the catalyst preparation procedure. It has been found that the rare earth compounds in bastnaesite do not allow ion exchange of the rare earths with the molecular sieve cation. This is advantageous as it prevents undesired rare earth exchange with the zeolites.

It is contemplated that the metal trap component of the present invention may be comprised of bastnaesite alone, any other rare earth containing component which will not exchange with molecular sieve cations, or any combination of bastnaesite with any such other rare earth containing component. Specific examples include rare earth carbonates, fluorocarbonates, oxyfluorides and phosphates containing lanthanum and/or cerium. The previously mentioned rare earth ores may be used. These materials will normally contain a mixture of rare earths including praseodymium, neodymium and samarium.

The matrix of the catalyst particles preferably consists of an admixture of active alumina (having cracking activity) and bastnaesite along with a binding agent such as a silica sol and an inert refractory oxide such as kaolin, such that the resulting matrix of the final catalyst particle has an average pore diameter in the range of 25–200 Å. As used herein the term "matrix" therefore refers to all materials in the catalyst except for the zeolite component and any sulfur oxide transfer agent present in the zeolite-containing particles. The alumina is preferably added as a powder blended into an aqueous slurry containing other components of the catalyst or blended into powdery forms of the other components.

The catalyst used in the subjects invention will preferably contain active alumina. The alumina will typically be used as part or all of the matrix of the catalyst but could form a substantial portion of the overall catalyst. The preferred alumina is a monohydrate. An especially preferred type of alumina due to present commercial considerations would be a boehmitic (crystalline alpha monohydrate) alumina. It is contemplated a pseudoboehmite alumina could also be employed. The subject invention should be successful with any alumina which converts to a gamma or delta phase of sufficient surface area, preferably over $150^2$/g. The large (greater than 500 m$^2$/g) surface area of the zeolite coupled with the presence of a sizable amount of zeolite in the catalyst particles results in the overall catalyst having a typical surface area over 150 m$^2$/g. The surface area of the overall (finished) catalyst is preferably between 150 and 350 m²/g and more preferably between 200 and about 300 m²/g.

The preferred sulfur oxide transfer agent comprises a spinel. The useful metal-containing spinels include a first metal and a second metal having a valence (oxidation state) higher than the valence of the first metal. The first and second metals may be the same metal or different metals. In other words, the same metal may exist in a given spinel in two or more different oxidation states. As indicated above, the atomic ratio of the first metal to the second metal in any given spinel need not be consistent with the classical stoichiometric formula for such spinel. In one embodiment, the atomic ratio of the first metal to the second metal in the metal-containing spinel useful in the present invention is at least about 0.17 and preferably at least about 0.25. If the first metal is a monovalent metal, the atomic ratio of the first metal to the second metal is preferably at least about 0.34, more preferably at least about 0.5.

The spinel structure is based on a cubic close-packed array of oxide ions. Typically, the crystallographic unit cell of the spinel structure contains 32 oxygen atoms; one-eighth of the tetrahedral holes (of which there are two per anion) are occupied by divalent metal ions, and one-half of the octahedral holes (of which there are two per anion) are occupies by trivalent metal ions.

This typical spinel structure or a modification thereof is adaptable to many other mixed metal oxides of the type $M^{II}M_2^{III}O_4$ (e.g., $FeCr_2O_4$, $ZnAl_2O_4$, and some of the type $M^{IV}M_2^{II}O_4$ (e.g., $TiZn_2O_4$ and $SnCo_2O_4$) and some by the type $M_2^IM^{VI}O_4$ (e.g., $Na_2MoO_4$ and $Ag_2MoO_4$). An important variant is the inverse spinel structure in which half of the Y ions are in tetrahedral interstices and the X ions are in octahedral ones along with the other half of the Y ions. The inverse spinel structure is intended to be included within the scope of the term "metal-containing spinel" as used herein. The inverse spinel structure occurs when the X ions have a stronger preference for octahedral coordination than do the Y ions. $Zn(ZnTi)O_4$, $Fe^{III}(Co^{II}Fe^{III})O_4$, $NiAl_2O_4$ and $Fe(NiFe)O_4$ are examples of inverse spinels.

Examples of metal-containing spinels include the following: $MnAl_2O_4$, $FeAl_2O_4$, $COAl_2O_4$, $NiAl_2O_4$, $ZnAl_2O_4$, $MgTiMgO_4$, $FeMgFeO_4$, $FeTiFeO_4$, $ZnSnZnO_4$, $GaMgGaO_4$, $InMgInO_4$, $BeLi_2F_4$, $MoLi_2O_4$, $SnMg_2O_4$, $MgAl_2O_4$, $CuAl_2O_4$, $(LiAl_5O_5O_8)$, $ZnK_2(CN)_4$, $CdK_2(CN)_4$, $HgK_2(CN)_4$, $ZnTi_2O_4$, $FeV_2O_4$, $MgCr_2O_4$, $MnCr_2O_4$, $FeCr_2O_4$, $CoCr_2O_4$, $NiCr_2O_4$, $ZnCr_2O_4$, $CdCr_2O_4$, $MnCr_2S_4$, $ZnCr_2S_4$, $CdCr_2S_4$, $TiMn_2O_4$, $MnFe_2O_4$, $FeFe_2O_4$, $CoFe_2O_4$, $NiFe_2O_4$, $CuFe_2O_4$, $ZnFe_2O_4$, $CdFe_2O_4$, $MgCo_2O_4$, $TiCo_2O_4$, $CoCo_2O_4$, $ZnCo_2O_4$, $SnCo_2O_4$, $CoCo_2S_4$, $CuCo_2S_4$, $GeNi_2O_4$, $NiNi_2S_4$, $ZnGa_2O_4$, $WAg_2O_4$, and $ZnSn_2O_4$.

The preferred metal-containing spinels for use in the present invention are alkaline earth metal spinels, in particular magnesium alumina spinel. Lithium containing spinels, which may be produced using conventional techniques are also preferred for use. Other alkaline earth metal ions, such as calcium, strontium, barium and mixtures thereof, may replace all or a part of the magnesium ions. Similarly, other trivalent metal ions, such as iron, chromium, vanadium, manganese, gallium, boron, cobalt and mixtures thereof, may replace all or a part of the aluminum ions. When the spinel includes a divalent metal (e.g., magnesium) and a trivalent metal (e.g., aluminum), it is preferred that the atomic ratio of divalent to trivalent metals in the spinel be in the range of about 0.17 to about 1.5, more preferably about 0.4 to about 1.0.

All of the magnesium is not in the spinel but is present as a solid solution with the spinel. The higher MgO content material is superior to a stochiometric spinel.

The metal-containing spinels useful in the present invention may be derived from conventional and well known sources. For example, these spinels may be naturally occurring or may be synthesized using techniques well known in the art.

A magnesium alumina spinel highly preferred for use in the present invention can be prepared according to the method disclosed in U.S. Pat. No. 2,992,191. The spinel can be formed by reacting, in an aqueous medium, a water-soluble magnesium inorganic salt and a water-soluble aluminum salt in which the aluminum is present in the anion. Suitable salts are exemplified by the strongly acidic magnesium salts such as the chloride, nitrate or sulfate and the water soluble alkali metal aluminates. The magnesium and aluminum salts are dissolved in an aqueous medium and a spinel precursor is precipitated through neutralization of the alumina by the acidic magnesium salt. Excesses of acid salt or alumina are preferably not employed, thus avoiding the precipitation of excess magnesia or alumina. Preferably, the precipitate is washed free of extraneous ions before being further processed.

The precipitate can be dried and calcined to yield the magnesium alumina spinel. Drying and calcination may take place simultaneously. However, it is preferred that the drying take place at a temperature below which water of hydration is removed from the spinel precursor. Thus, this drying may occur at temperatures below about 260° C. (500° F.), preferably from about 104° to about 232° C. (220° to 450° F.). Suitable calcination temperatures are exemplified by temperatures ranging from about 426°-1093° C. (800° to 2000° F.) or more. Calcination of the spinel precursor may take place in a period of time of at least about five minutes and preferably in a period of time ranging from about 0.5 to about 3 hours. Another process for producing the presently useful magnesium alumina spinel is set forth in U.S. Pat. No. 3,791,992 which is hereby incorporated herein by reference. In general, as indicated previously, the metal-containing spinels useful in the present invention may be prepared by methods which are conventional and well known in the art.

The metal spinel-based composition may be formed into particles of any desired shape such as pills, cake, extrudates, powders, granules, spheres, and the like using conventional methods. The size selected for the particles is dependent upon the intended environment in which the final discrete entities are to be used. For example, in a circulating FCC catalyst, the particles will fall within the size range of the FCC catalyst.

Substantially non-interfering proportions of other well known refractory material, e.g., inorganic oxides such as silica, zirconia, thoria and the like may be included in the sulfur oxide transfer component. Free magnesia and/or alumina (i.e., apart from the alkaline earth metal containing spinel) may be included in the sulfur oxide transfer component, e.g., using conventional techniques. For example, the sulfur oxide transfer component may include about 0.1% to about 25% by weight of free magnesia (calculated as MgO). By substantially "non-interfering" is meant amounts of other material which do not have a substantial deleterious effect on the catalyst system or hydrocarbon conversion process. The inclusion of materials such as silica, zirconia, thoria and the like into the sulfur oxide transfer particles may act to improve one or more of the functions of the particles or the overall catalyst system.

The spinels require an oxidation component, e.g., a rare earth component, to be effective SOX transfer agents. The spinels are preferably associated with a minor amount of at least one rare earth metal component. Cerium or other suitable rare earth or rare earth mixture may be associated with the spinel using any suitable technique or combination of techniques; for example, impregnation, coprecipitation, ion-exchange and the like, well known in the art, with impregnation being preferred. Impregnation may be carried out by contacting the spinel with a solution, preferably aqueous, of rare earth; for example, a solution containing cerium ions (preferably $Ce^{+3}$, $Ce^{+4}$ or mixtures thereof) or a mixture of rare earth cations containing a substantial amount (for example, at least 40%) of cerium ions. Water-soluble sources of rare earth include the nitrate and chloride. Solutions having a concentration of rare earth in the range of 3 to 30% by weight are preferred. Preferably, sufficient rare earth salt is added to incorporate about 0.05 to 25% (weight), more preferably about 0.1 to 15% rare earth, and still more preferably about 1.0 to 15% rare earth, by weight, calculated as elemental metal, on the particles.

It may not be necessary to wash the spinel after certain soluble rare earth salts (such as nitrate or acetate) are added. After impregnation with rare earth salt, the spinel can be dried and calcined to decompose, the salt, forming an oxide in the case of nitrate or acetate. Alternatively the spinel, e.g., in the form of discrete particles, can be charged to a cracking unit with the rare earth in a salt form. In this case a rare earth salt with a thermally decomposable anion can decompose to the oxide in the reactor and be available to associate with sulfur oxides in the regenerator.

Especially good results are achieved using a spinel containing a rare earth metal, e.g., cerium, calculated as the metal, is in the range of about 1 to 25%, more preferably about 2 to about 15%, by weight of the sulfur oxide transfer particles.

The sulfur oxide transfer particles of the dual particle system could comprise a minor amount of at least one crystalline aluminosilicate capable of promoting the desired hydrocarbon conversion but this is not preferred. The sulfur oxide transfer particles are therefore essentially free of zeolites.

The sulfur oxide transfer particles which contain a metal spinel may also contain at least one additional metal, e.g., platinum group metal, component capable of promoting the oxidation of sulfur dioxide to sulfur trioxide at combustion conditions, e.g., the conditions present in the catalyst regenerator. However, increased carbon monoxide oxidation may also be provided by the additional metal components and this may not be desired in specific FCC units. Such metal components may be selected from Group VIII of the Periodic Table and may be incorporated into the particles in any suitable manner. The additional metal, e.g., platinum group metal, such as platinum, palladium or ruthenium may exist within the spinel-containing particulate material, at least in part as a compound such as an oxide, sulfide, halide and the like, or in the elemental state. Generally, the amount of the platinum group metal component present in the final spinel-containing particles would be small compared to the quantity of the spinel due to the cost of platinum group metals. The platinum group metal component would comprise from about 0.05 parts-per-million (ppm) to about 1%, more preferably about 0.5 ppm to about 500 ppm, by weight of the particles, calculated on an elemental basis.

Due to the high cost of platinum group metals and their potential to promote conversion of carbon monoxide to carbon dioxide, it is preferred to employ a rare earth oxide rather than a Group VIII metal in the sulfur oxide transfer particle. They are therefore preferably essentially free of Group VIII metals.

Any additional metal component may be associated with the spinel based composition in any suitable manner, such as by the impregnation of the spinel at any stage in its preparation and either after or before calcination of the spinel based composition. As indicated previously, various procedures for incorporating the additional metal component or components into the particulate material are conventional and well known in the art. Preferably, the additional metal component is uniformly disposed on the spinel. One method for adding the platinum group metal to the spinel involves the utilization of a water soluble compound of the platinum group metal to impregnate the spinel. For example, platinum may be added to the spinel by commingling the spinel with an aqueous solution of chloroplatinic acid. Other water-soluble compounds of platinum group metals may be employed as impregnation solutions, including, for example, ammonium chloroplatinate, platinum chloride and ruthenium nitrate.

As mentioned, a spinel-containing sulfur oxide transfer component is preferably located in separate particles from the zeolite/metal trap components resulting in a two-particle catalyst system. It is also contemplated that a three-particle system would also allow the sulfur oxide transfer component to protect the metal trap component. This embodiment may be characterized as a three-particle FCC catalyst system which comprises an intimate admixture of (i) particles containing from about 10 to 40 wt. % zeolite and about 2 to 30 weight percent active matrix alumina; (ii) about 1 to 5 wt. percent of particles containing a sulfur oxide trapping component comprising a magnesium spinel; and, (iii) about 3 to 15 weight percent of particles comprising a metal trap chosen from the group consisting of barium titanate, calcium titanate and bastnaesite.

The subject invention was verified in a short term test in a commercial fluidized catalytic cracking unit processing a metal-containing feedstock. The process unit was operating at essentially steady state conditions using a commercially available catalyst supplied by Katalistiks International, a unit of UOP, which contained an LZ-210 zeolite, alumina, a silica sol binder, clay and 5 wt. percent bastnaesite as a metals trap. Samples of the circulating equilibrium catalyst were obtained and subjected to a MAT (micro activity) test to determine catalyst activity. MAT tests are a described in ASTM test methods such as D-32 MAT test D-3907-80. The MAT test used in this series of experiments was adjusted to reflect internal standards. The steady state (pretest) MAT activity was in the range of from 68 to 69. The vanadium content of the catalyst was in the range of 5200 to 5400 ppm.

During the test a spinel containing sulfur oxide transfer material was added at a concentration of approximately 3 wt. percent based on the catalyst. This spinel material also contained magnesium, alumina, and ceria and was free of platinum in keeping with the preferences set out herein. Monitoring the MAT activity of the catalyst indicated that the activity of the catalyst increased to the range of 74–75. The surface area of the catalyst remained constant at approximately 120 m²/gm and the metals content of the equilibrium catalyst did not change.

During the test the sulfur oxide emissions in the flue gas from the regeneration zone were significantly reduced. The addition of the sulfur oxide transfer agent therefore provided two benefits; increased catalyst activity and reduced sulfur oxide emissions.

The catalyst used in this test was formulated with a Beta type LZ-210 molecular sieve having a unit cell size of 24.52 Angstroms and 5 wt. percent Bastnaesite and an alumina matrix component. The catalyst contained 25 wt % rare earth ion exchanged molecular sieve and had a surface area of 225 m²/g.

The catalytic properties of the catalyst samples were determined in a microactivity test (MAT) unit at the following conditions:

Reactor temperature 510° C.
Weight Hourly Space Vel. 16
Cat/Oil WT/WT 3.0
Oil Delivery Time (sec) 75

The vacuum gas oil used as reactor feed for this MAT test had the following analysis:

| Distillation | °C. |
| --- | --- |
| IBP | 246 |
| 5% | 354 |
| 10% | 376 |
| 20% | 398 |
| 50% | 444 |
| 90% | 514 |
| 95% | 531 |
| EP | 552 |
| Density g/cc (15° C.) | 0.907 |
| Ramsbottom carbon | 0.23 wt % |
| Sulphur | 0.44 wt % |
| Basic nitrogen | 340 PPMW |
| Refractive index (40° C.) | 1.4960 |

The molecular sieve content of the catalyst used in the present invention can vary between 10–50 wt % of the total formulation, preferably in the range of 20–40 wt %. The alumina content can vary between 0.5–25 wt % of the total formulation, preferably 5–20 wt %. The catalyst preferably contains over 5 wt. % alumina. Preferably, the metal trap component such as bastnaesite will form about 0.5–15 wt % preferably 3–15 wt. % and more preferably 3–10 wt % of the finished catalyst particles.

The catalyst binder can form between 10–25 wt %, and preferably 15–20 wt % of the finished catalyst. It is preferred to use a siliceous binder such as sodium silicate. The inert refractory oxide content can vary between 20–60 wt %, preferably between 25–40 wt %. Clay of several types can be employed. Kaolin is a suitable material for this purpose. It is preferred that the matrix is free of any catalytically active material other than those set out herein such as added silica-alumina.

One embodiment of the invention may accordingly be characterized as a fluidized catalytic cracking process which comprises simultaneously contacting a metal-containing chargestock with a catalyst system comprising an admixture of (i) catalyst particles comprising about 10 to 40 wt. % zeolite, about 2 to about 30 wt. percent active alumina and about 2 to about 15 wt. percent of a vanadium trap component and (ii) sulfur oxide transfer particles comprising a magnesium-containing spinel in an FCC reaction zone maintained at reaction conditions.

The catalyst compositions of the present invention may be prepared in a conventional manner using known techniques such as those described in the references cited herein.

Another embodiment of the invention may accordingly be characterized as a method of manufacturing an FCC catalyst which comprises forming an admixture which comprises: (i) from about 10–40 wt. % zeolite; (ii) about 0.5 to about 20 wt. percent of a sulfur oxide transfer agent, such as a magnesium aluminum spinel; (iii) about 3 to 15 weight percent of a metal trap component chosen from the group consisting of rare earth carbonates, rare earth oxy fluorides, rare earth phosphates, barium titanates and calcium titanates (preferably bastnaesite); (iv) about 10 to 25 weight percent of a binder; and (v) about 20 to about 60 wt. percent of an inert refractory oxide and/or alumina; and, forming catalyst-sized particles containing said admixture as by spray drying.

FCC catalyst is normally a fine powder having particle diameters of 20–150 microns and an average diameter of 60–80 microns. The catalyst particles of the subject invention are uniform in composition and are essentially not separable into fractions of differing composition or characteristics as by elutriation. The catalyst particles and sulfur oxide transfer particles may be premixed to form the catalyst system or added separately to the FCC unit. It is preferred that the sulfur oxide transfer particles are of the same general size and density as the catalyst particles so that they do not tend to separate from the catalyst particles within the overall FCC process.

While the benefits of the present invention have only been exemplified utilizing an LZ-210 type molecular sieve as molecular sieve component of the catalyst, it is contemplated that any other sieve derived from Na-Y zeolite may be used to equal advantage. Such sieves include without limitation rare earth hydrogen Y, calcined rare earth Y, LZ-210 molecular sieves and other dealuminated or ultrastable molecular sieves including those described in U.S. Pat. Nos. 4,401,556 (columns 6–81) and 4,869,803 which are incorporated herein by reference for their teaching as to the preparation of dealuminated Y zeolites. The use of LZ-210 zeolite in an FCC process is described in U.S. Pat. 4,588,496 to Scherzer which is incorporated by reference. The preparation of an LZ-210 zeolite is described in detail in U.S. Pat. No. 4,610,856 to Skeels et al., which is incorporated herein by reference for its teaching of preparation techniques. Beta zeolite can also be employed in the subject catalyst as a portion or all of the molecular sieve component. The use of Beta zeolite in an FCC process is described in U.S. Pat. No. 4,740,292 to N.Y. Chen et al., which is also incorporated herein for its teaching as to the structure of zeolite Beta and the conditions and techniques of utilizing zeolites including zeolite Beta in an FCC process. Some ZSM or MFI type zeolite can also be present in the catalyst in addition to the Y zeolite.

While the invention has been described with respect to various specific examples and embodiments, it is to be understood that the invention is not limited thereto and that it may be variously practiced within the scope of the following claims.

What is claimed:

1. In a fluidized catalytic cracking process which comprises contacting, in an FCC reaction zone maintained at reaction conditions, a metal-containing chargestock with a catalyst system comprising catalyst particles comprising about 10 to 40 wt. % zeolite, about 2 to about 30 wt. percent active alumina and about 2 to about 15 wt. percent of a vanadium trap component the inprovement which comprises increasing the activity of said catalyst particles by circulating sulfur oxide transfer particles comprising a magnesium-containing spinel through the FCC process in admixture with said catalyst particles.

2. The process of claim 1 wherein the amount of sulfur oxide transfer particles in the catalyst system is equal to from about 1 to about 20 wt. percent of the catalyst particles in the catalyst system.

3. The process of claim 1 wherein the vanadium trap component comprises bastnaesite.

4. The process of claim 1 wherein the vanadium trap component comprises a metal titanate.

5. A fluidized catalytic cracking process which comprises simultaneously contacting a metal-containing chargestock with (i) a catalyst comprising about 10 to 40 wt. % zeolite and about 3 to 15 weight percent of a nonexchangeable rare earth component comprising a rare earth carbonate, oxy fluoride or phosphate; and (ii) a second discrete particle comprising a sulfur oxide trapping component in an FCC reaction zone maintained at reaction conditions and recovering product hydrocarbons.

6. The process of claim 5 wherein the rare earth component is bastnaesite.

7. The process of claim 5 wherein the sulfur oxide trapping component is a spinel.

8. The process of claim 5 wherein the zeolite is selected from the group consisting of Y zeolites, dealuminated Y zeolite, rare earth-containing zeolite Y, zeolite beta, and LZ-210 molecular sieves.

* * * * *